J. Creager,
Circular Sawing Machine.
N° 44,609. Fig 1. Patented Oct. 11, 1864.
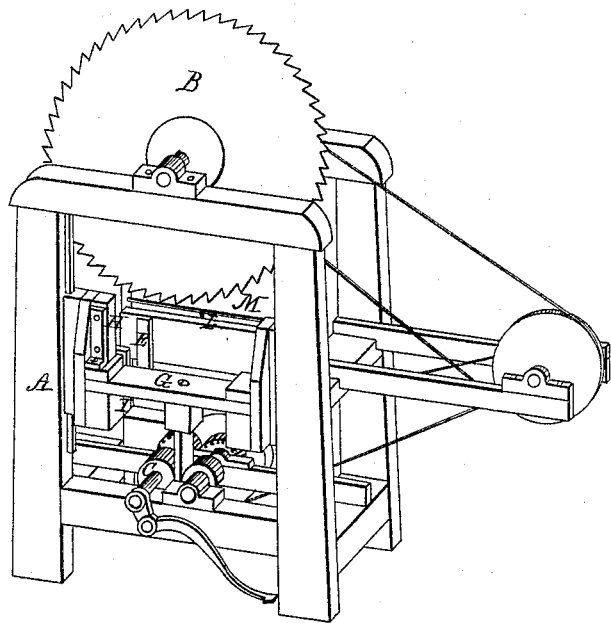
Fig 2.
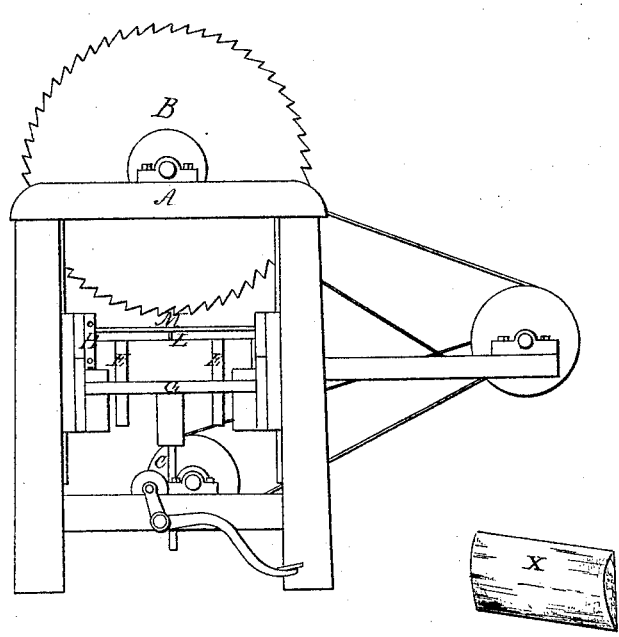
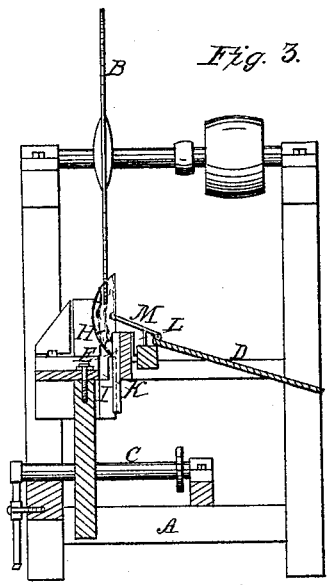
Witnesses.
James H. Layman
W. D. Cott
Inventor
J. Creager
pr Knight Bros
attys

UNITED STATES PATENT OFFICE.

JONATHAN CREAGER, OF CINCINNATI, OHIO.

IMPROVEMENT IN SAWING-MACHINES.

Specification forming part of Letters Patent No. 44,609, dated October 11, 1864.

*To all whom it may concern:*

Be it known that I, JONATHAN CREAGER, of Cincinnati, Hamilton county, Ohio, have invented a new and useful Improvement in Circular Sawing Machines; and I hereby declare the following to be a full, clear, and exact description thereof, reference being had to the accompanying drawings, making part of this specification.

My present improvement relates to the class of machines which contain a vertical circular saw employed to work up slabs and blocks into small boards suitable for packing-boxes, wash-boards, bureau-stuff, &c., my invention being directed chiefly to devices for properly holding the severed portion and for effectually discharging the same.

Figure 1 is a perspective view of a circular sawing machine embodying my improvements. Fig. 2 is a front elevation thereof. Fig. 3 is a section in the vertical plane of the saw-shaft.

The frame A, saw B, feed-impelling mechanism C, gage E, and the discharging-chute D may be substantially the same as in my patent for improvement in circular sawing machines, dated the 12th day of October, 1858. That portion of the feeding-table G toward which the saw cuts is provided with a shoulder, H, which is made adjustable toward the plane of the saw, to enable it to be set forward as it becomes worn by the fraying action of the saw.

I is one of a pair of rests which are united at bottom to the back of the feeding-table G, between which and themselves a gap or interval, K, is left, sufficient for the passage of the saw-blade.

The office of the rests I is to support that portion of the stuff which is in rear of the saw.

The necessity of the rests I becomes apparent when it is understood that much of the material worked up consists of slabs, such as indicated by red lines in Fig. 3, and at X. The "flat" of such slabs being always presented toward the saw, their chief and often only support is from the rests I.

In the machine described in my aforesaid patent, the discharge of the work was effected by means of elastic fingers, which, although fulfilling in degree the purpose for which they were devised, were found in practice to possess some serious defects, for whenever they happened to be somewhat too yielding for the weight of the piece they would bend down so as to become entangled in the teeth of the saw; and, on the other hand, when the fingers were too stiff, they acted to oppose the ascent of the stuff, and to press it away from the gage, so as to cause an irregular and uneven cut.

In order to remedy the above defects, I have substituted for my elastic fingers a device named by me the "gravitating discharger," and constructed as follows:

M is a flap or apron, of wood or metal, hinged, $m$, by its lower edge to the chute D, and upheld in the represented inclined position very near the rear side of the saw, but so as not to touch the same, by means of the elevated bearing-piece or support L. On the ascent of the feeding-table the flap M $m$ easily gives way to the pressure of the ascending stuff, and, dropping below the part of the stuff which is in rear of the saw, without touching the latter, affords an immovable resting-place for the separated piece, which it conducts safely onto the chute.

I claim herein as new and of my invention—

1. The rests I, attached at their lower ends to the back of the feeding-table G, and passing up in rear of the saw, the same being constructed and operating as set forth.

2. The provision, in rear of a circular saw, of the inclined gravitating apron or flap M, whose lower edge is connected by means of a hinge, $m$, to the chute D, and whose upper edge is supported in near proximity to without touching the saw blade, substantially as set forth.

In testimony of which invention I have hereunto set my hand.

JONATHAN CREAGER.

Witnesses:
GEO. H. KNIGHT,
I. N. STORY.